US008522059B2

(12) United States Patent
Jeansonne et al.

(10) Patent No.: US 8,522,059 B2
(45) Date of Patent: Aug. 27, 2013

(54) DISPLAY PANEL POWER PREDICTION

(75) Inventors: Jeffrey Kevin Jeansonne, Houston, TX (US); Jung Suk Lee, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 571 days.

(21) Appl. No.: 12/624,600

(22) Filed: Nov. 24, 2009

(65) Prior Publication Data

US 2011/0126029 A1 May 26, 2011

(51) Int. Cl.
*G06F 1/26* (2006.01)
*G06F 1/32* (2006.01)

(52) U.S. Cl.
USPC ........... 713/320; 713/300; 713/310; 713/340; 345/77

(58) Field of Classification Search
USPC .................... 713/300, 310, 320, 340; 345/77
See application file for complete search history.

(56) References Cited

U.S. PATENT DOCUMENTS

| | | | | |
|---|---|---|---|---|
| 5,956,014 | A | 9/1999 | Kuriyama | |
| 6,380,943 | B1 | 4/2002 | Morita | |
| 7,360,106 | B2 | 4/2008 | Kato | |
| 7,725,009 | B2 * | 5/2010 | Suzuki | 386/277 |
| 2006/0013570 | A1 * | 1/2006 | Suzuki | 386/125 |
| 2008/0018640 | A1 | 1/2008 | Tada | |
| 2008/0238837 | A1 * | 10/2008 | Yamaguchi | 345/77 |
| 2009/0115766 | A1 * | 5/2009 | Stessen et al. | 345/211 |
| 2009/0271046 | A1 * | 10/2009 | Lewis et al. | 700/291 |
| 2009/0276651 | A1 * | 11/2009 | Conroy et al. | 713/340 |
| 2010/0060658 | A1 * | 3/2010 | Fujii et al. | 345/589 |
| 2010/0238293 | A1 * | 9/2010 | Baronas et al. | 348/160 |
| 2010/0312874 | A1 * | 12/2010 | Jansen et al. | 709/224 |
| 2012/0005505 | A1 * | 1/2012 | Tolia et al. | 713/320 |

FOREIGN PATENT DOCUMENTS

| | | |
|---|---|---|
| EP | 1821277 | 8/2007 |

* cited by examiner

*Primary Examiner* — Jaweed A Abbaszadeh

(57) ABSTRACT

Power consumption data for a first group of brightness settings is stored in a memory. At least a portion of the power consumption data is used to predict power consumption data for a second group of brightness settings.

20 Claims, 4 Drawing Sheets

DISPLAY PANEL POWER PREDICTION

BACKGROUND

Computer users are becoming increasingly energy conscious. In particular, such users frequently desire to conserve energy where possible, both to increase battery life of portable computing devices (e.g., notebooks, etc.) and to decrease the overall energy impact to the environment resulting from connecting various computing devices (e.g., desktops, notebooks, etc.) to a power source.

BRIEF DESCRIPTION OF DRAWINGS

The following description includes discussion of figures having illustrations given by way of example of implementations of embodiments of the invention.

DETAILED DESCRIPTION

Figure 1:
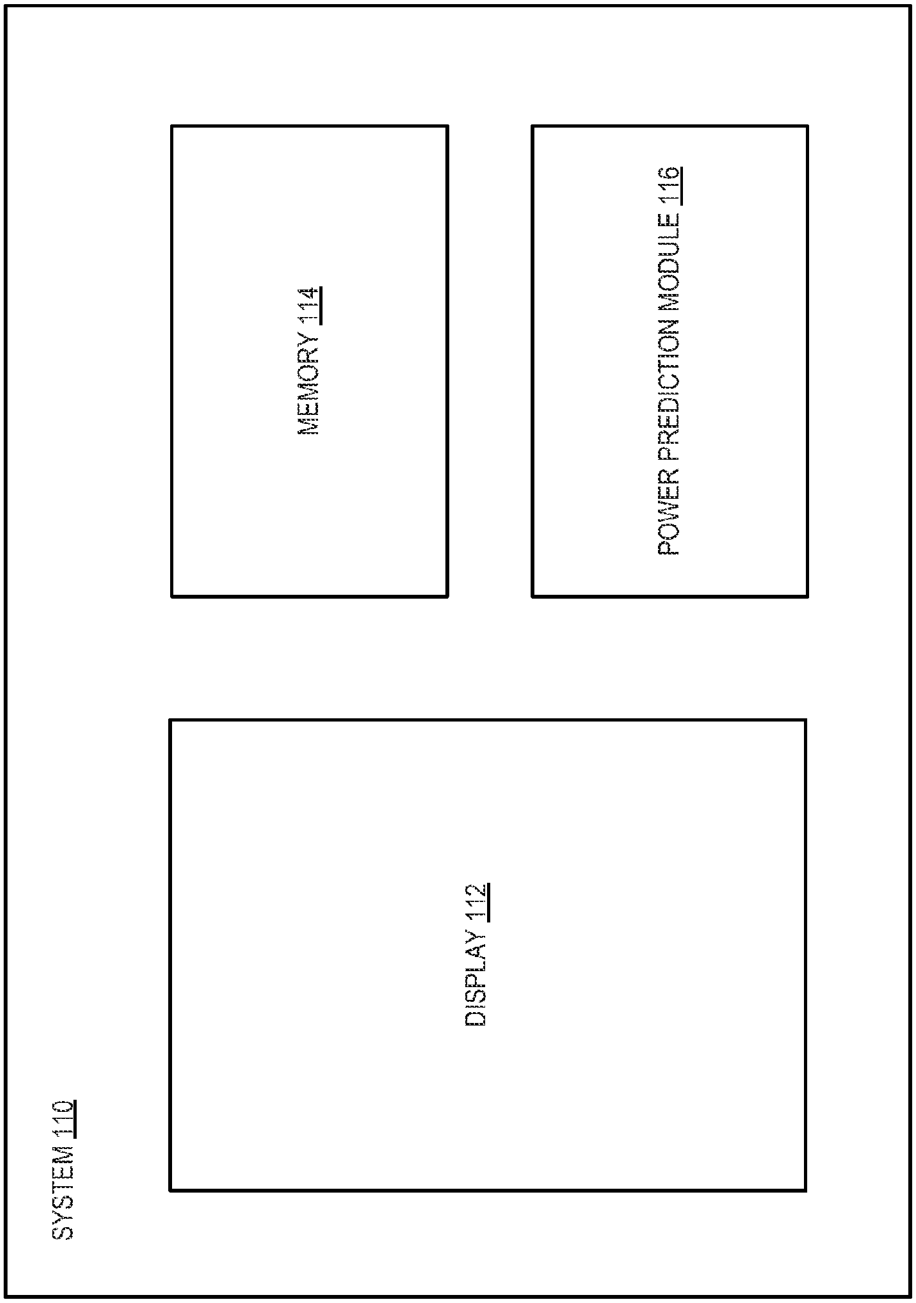
FIG. 1 is a block diagram illustrating a system according to various embodiments.

As provided herein, various methods, systems, an apparatuses enable power consumption predictions for a computer platform that includes a display panel. As used herein, a display panel, or simply "display" or "panel", refers to any type of display connected to and/or integrated with a computing device (e.g., workstation, desktop, notebook, netbook, handheld device, etc.). Many computing devices use liquid crystal display (LCD) technology in the display, but embodiments of the inventions are not limited as such. Others types of display technology can be used in various embodiments, including, but not limited to digital light processing (DLP), plasma, and the like.

Display panel power can be vastly different between display sizes and can even be significantly different between displays of the same size from different vendors. For at least this reason, various solutions created to convey power consumption predictions to a user are benefited by having the flexibility to support the differences between displays, as described above.

Display panel vendors have the ability, albeit a burdensome one, to generate and provide detailed information on panel power consumption at the full range of brightness settings (e.g., based on average measured power consumption values). However, not only can it be burdensome to provide such data, but valuable platform firmware and/or software resources are frequently consumed to maintain databases on the computing device with this information. Not only are resources frequently consumed to track and integrate information for all supported display panels, these resources would need to be updated to support new display panels over time.

In various embodiments, a computing device platform receives and/or stores power measurements for multiple brightness setting samples of the display. Various embodiments described herein rely on average backlight power measurements of the display, but other types of power consumption measurements could be used in alternate embodiments (e.g., median values, single-measurement values, estimated values, etc.).

As few as two power measurement samples, referred to as panel power data (PPD) values, may be used to predict power consumption for the full range of brightness settings in certain embodiments. More measurement samples could be used in other embodiments. In particular, embodiments described herein rely on'one power measurement at a mid-point brightness setting and another measurement at the display's maximum brightness setting. The mid-point brightness setting does not need to be the exact midpoint. As an example, the maximum brightness setting for a particular display panel might be 120 candelas per square meter, while the mid-point brightness setting might be 60 candelas per square meter ($cd/m^2$, also referred to as "Nits"). Other brightness setting points could be used to similarly provide PPD values.

The provided PPD values could be stored in a lookup table on the computing device's platform or they could be stored in a separate memory device, for example, included in the display panel. In embodiments with a separate memory device, the memory device is accessible via the basic input/output system (BIOS) and/or extensible firmware interface (EFI), the operating system, and/or other software on the computing device.

In various embodiments, the PPD values are used to estimate/predict display panel backlight power at any brightness setting by computing a gain value and an offset value and using those values to generate an estimated power value, described in more detail below.

FIG. 1 is block diagram illustrating a system according to various embodiments. System 110 includes at least a display 112, a memory 114, and a power prediction module 116. The components of system 110 may be arranged differently than shown in FIG. 1. For example, display 116 may be integrated into system 110 as shown (such as in a notebook computer or all-in-one computer, etc.) or it may be an external display (e.g., an external monitor) connected to system 110. As another example, memory 114 may be integrated with display 112 in certain embodiments.

Memory 114 stores power consumption data corresponding to a group of brightness settings for display 112. As discussed above, the stored power consumption data may include as few as two PPD values (along with the corresponding Nits values for the two PPD values). For example, in some embodiments, memory 114 stores PPD values for a mid-point brightness level (e.g., 60 Nits) and a maximum brightness level. Other and/or more brightness levels could be used in different embodiments. Memory 114 can be any type of memory including, for example, read only memory (ROM), random access memory (RAM), magnetic disk storage media, optical storage media, flash memory devices, etc. The PPD values may be stored in memory 114 as a table in various embodiments.

Power prediction module 116 predicts power consumption data for brightness levels not stored in memory 114 using the stored PPD values. Power prediction module 116 can be implemented as one or more software modules, hardware modules, special-purpose hardware (e.g., application specific hardware, application specific integrated circuits (ASICs), embedded controllers, hardwired circuitry, etc. In embodiments where memory 114 stores PPD values for mid-point brightness and maximum brightness, power prediction module 116 predicts power consumption (e.g., in mW) at a particular brightness level (e.g., in $cd/m^2$) according to the following:

$$\text{Gain} = \frac{\frac{P_{max}}{B_{max}} - \frac{P_{mid}}{B_{mid}}}{B_{max} - B_{mid}} \tag{1}$$

where $P_{max}$ is the power measurement at the maximum brightness level, $B_{max}$, and where $P_{mid}$ is the power measurement at some intermediate brightness level, $B_{mid}$, $$\text{Offset} = \frac{P_{mid}}{B_{mid}} - \text{Gain} \times B_{mid} \tag{2}$$

$$\text{Estimated Power} = B_i^2 \times (\text{Gain} + \text{Offset}) \tag{3}$$

where $B_i$ is the brightness level for which the power is being estimated.

In alternate embodiments, power prediction module 116 determines the offset used in equation (3) by taking a single power-to-luminance ratio and using it to find b (offset) from the equation of a line:

$$y = mx + b \tag{4}$$

where m is the power-to-luminance ratio. Other suitable methods could be used to determine the offset in alternate embodiments.

Figure 2:
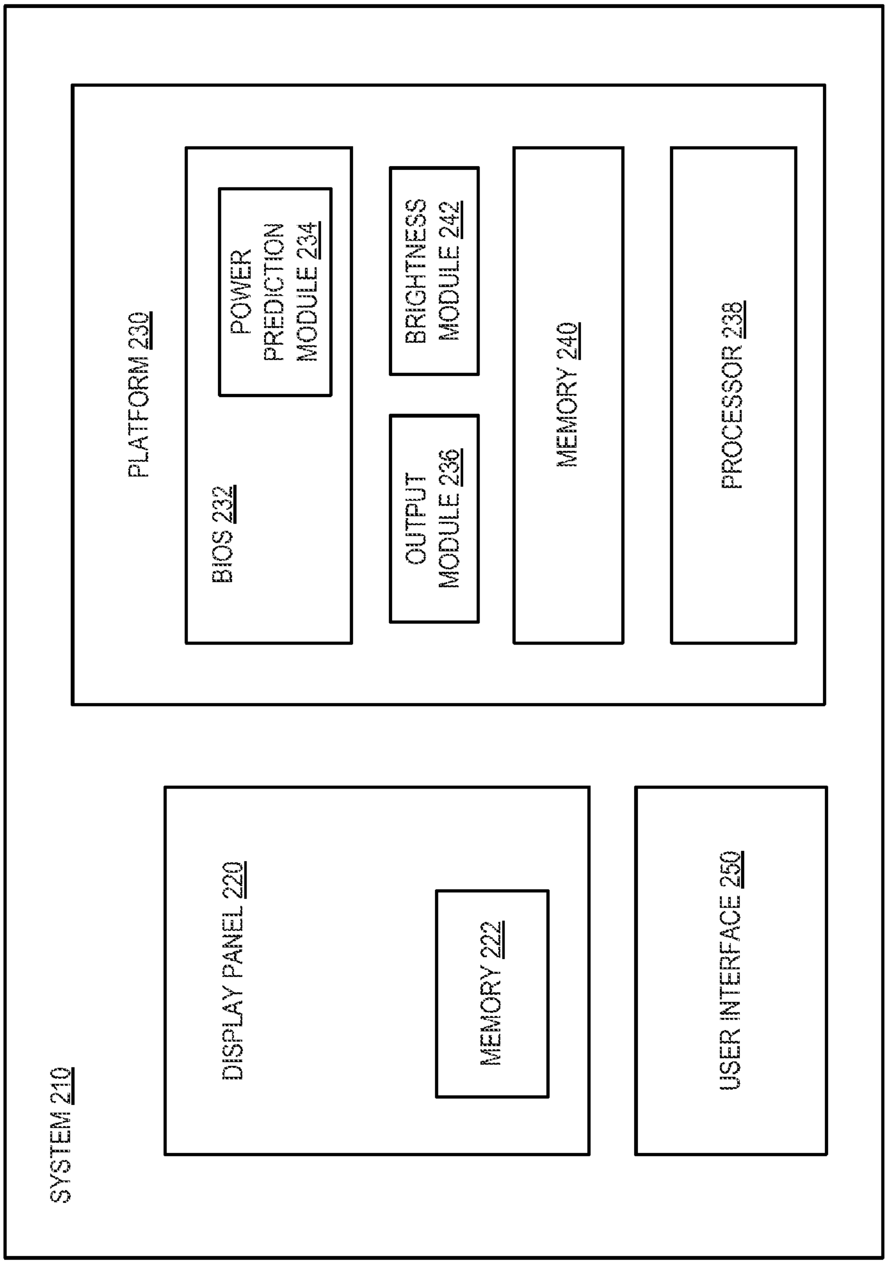
FIG. 2 is a block diagram illustrating a system according to various embodiments.

FIG. 2 is a block diagram illustrating a system according to various embodiments. System 210 includes various components including a display 220, a platform 230 with memory 240, and a user interface 250. System 210 can be any type of computing device including, but not limited to, a workstation, desktop, notebook, netbook, all-in-one computer, handheld device, etc. As with the system of FIG. 1, the components of FIG. 2 may be arranged differently than shown in different embodiments. For example, in some embodiments, display panel 220 can be an externally connected display rather than a physically integrated display as shown in FIG. 2. Additionally, various embodiments may have more components or few components than shown in FIG. 2.

BIOS 232 can be integrated with memory 240 in certain embodiments or can be implemented as in a separate memory device, as shown. In embodiments where BIOS 232 is separate from memory 240, BIOS 232 may have access to memory 240. Additionally, BIOS 232 may access memory 222 in certain embodiments, described in more detail below.

As discussed previously, various embodiments store power panel data (PPD) values for use in predicting power consumption corresponding to various display panel brightness settings. In various embodiments, PPD values may include power consumption data for display 220 at two or more brightness settings. PPD values may be stored in BIOS 232, memory 240, memory 222 or some combination of these in different embodiments. Power prediction module 234 accesses PPD values wherever they are stored in system 210. In some embodiments, power prediction module 234 may obtain PPD values via a network connection, computer-readable storage medium or the like.

PPD values, or power consumption data values, are used as inputs to determine power consumption estimates. In embodiments where PPD values are stored for mid-point brightness and maximum brightness of display 220, power prediction module 234 predicts power consumption (e.g., in mW) at a particular brightness level (e.g., in cd/$m^2$) according to some combination of equations (1)-(4) discussed above. Variations to equations (1)-(4), or other suitable equations, could alternately be used to further refine the power predictions in some embodiments.

The functions of power prediction module 234 may be executed by processor 238. Once a power prediction is made, output module 236 reports the power consumption prediction as a contribution to be used in a power management decision. A power consumption prediction is a prediction and/or estimate of the power consumption of display panel 220 based on a desired brightness setting. Thus, the power prediction could be reported and/or sent in various forms. Predictions can be directly displayed on display 220 via user interface 250, allowing a user to interpret the prediction and adjust the brightness of display 220 accordingly via brightness module 242. Alternatively, predictions can be used internally by system 210 to contribute to an automatic system power management application. Additionally, power predictions can be used for some combination of user power management and/or automatic system power management.

Figure 3:
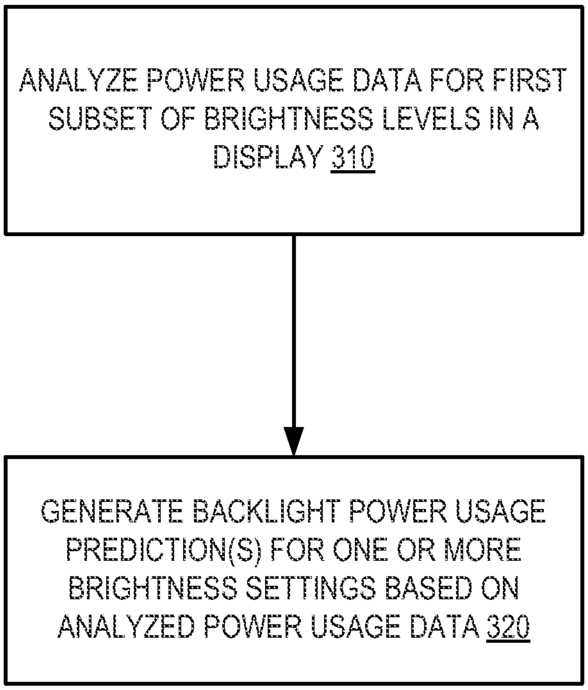
FIG. 3 is a flow diagram of operation in a system according to various embodiments.

FIG. 3 is a flow diagram of operation in a system according to various embodiments. A system analyzes 310 power usage data for a first subset of display panel brightness levels. Thus, if a display panel includes a plurality of brightness settings, power usage data from a subset of those settings (e.g., two) may be sufficient to predict power usage for any other brightness setting on the display panel. The power usage data that is analyzed may be stored in a memory associated with a computer system to which the relevant display panel is connected or within which it is integrated.

The power usage data is analyzed to determine a gain value and an offset value in some embodiments. Based on the gain and offset values, the computer system generates 320 power usage predictions for one or more brightness settings/levels. A system output module may provide generated predictions for rendering on a display, for example, in numeric, graphical, or other visual form. Base on this information, a user may manually adjust brightness parameters on the display to fit the user's desired power profile. Similarly, the generated predictions can be used internally within the computer system to contribute to an automatic power management application.

Figure 4:
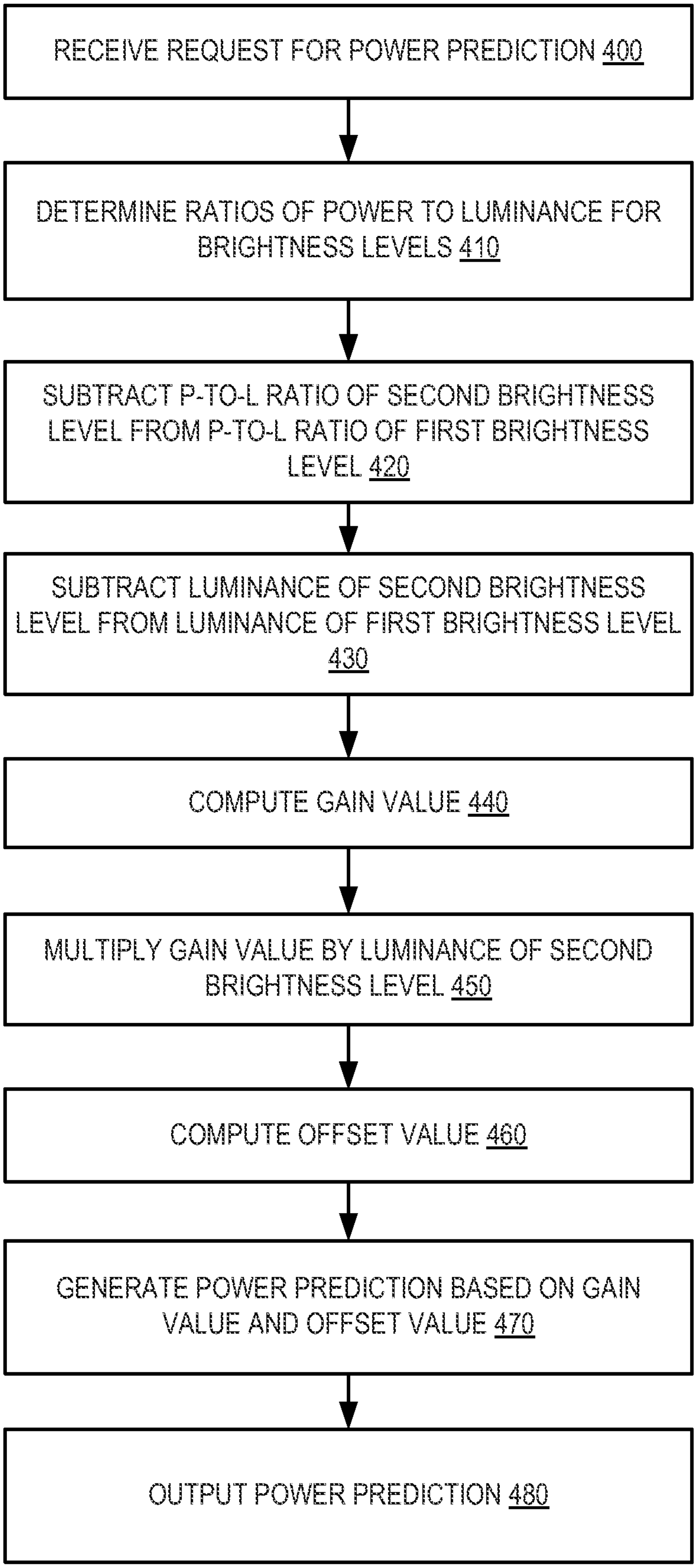
FIG. 4 is a flow diagram of operation in a system according to various embodiments.

FIG. 4 is a flow diagram of operation in a system according to various embodiments. It should be noted that steps discussed in FIG. 4 may be performed in a different order than shown; also, there may be more steps or fewer steps in various embodiments. A request for display panel power prediction is received 400. This request could be directly from a user or it could be an automatic internal system request. Having received the request, ratios of power-to-luminance are determined 410 for at least two brightness levels based on known power consumption data values (e.g., stored in a memory). For example, one power-to-luminance ratio could be determined for a maximum brightness setting while another power-to-luminance ratio could be determined for a mid-point brightness setting associated with the corresponding display panel.

The power-to-luminance ratio of the lower brightness setting is subtracted 420 from the power-to-luminance ratio of the higher brightness setting to form a numerator value used in computing a gain. The luminance of the lower brightness setting is then subtracted 430 from the luminance of the higher brightness setting to form a denominator value used in computing the gain. The numerator value is then divided by the denominator value to compute 440 the gain value. The gain value could be computed differently in other embodiments.

In various embodiments, the gain value is multiplied 450 by the luminance value of the lower (e.g., mid-point) brightness setting to form a modified gain value. The modified gain value is subtracted from the power-to-luminance ratio of the lower brightness setting to compute 460 an offset value. In alternate embodiments, the offset value may be computed taking one of the power-to-luminance ratios and solving the equation y=mx+b for b.

The square of the luminance associated with the brightness setting for which the prediction is being made is then calculated and multiplied by the previously calculated gain value to form a multiplied value. The offset value is then added to this multiplied value to generate 470 a power prediction for the specified brightness setting. The generated prediction is then output 480 for use by the system or by a user to facilitate power management decisions.

As discussed above, power predictions can be initiated by a user request or they may be initiated automatically as part of an automatic system process or some combination of the two. For example, a user might initiate a power management application that provides real-time data on actual power consumption of the system. As part of the application, power predictions could be automatically generated on a periodic basis. The power predictions could initially be based on stored PPD values provided by a display panel vendor. However, in various embodiments, the power management application (or other mechanism) could update stored values with recently measured values. Again, only a subset of PPD values need to be stored in memory to generate display panel power predictions and thus only a subset of PPD values might be updated with recently measured values.

Elements of embodiments may also be provided as a computer-readable medium for storing the computer-executable instructions. The computer-readable storage medium may include, but is not limited to, flash memory, optical disks, CD-ROMs, DVD ROMs, RAMs, EPROMs, EEPROMs, magnetic or optical cards, or other type of machine-readable media suitable for storing electronic instructions. For example, embodiments of the invention may be downloaded as a computer program which may be transferred from a memory on a remote computer (e.g., a server) to a memory on a requesting computer (e.g., a client).

Various components described herein may be a means for performing the functions described herein.

Aside from what is described herein, various modifications may be made to the disclosed embodiments and implementations of the invention without departing from their scope. Therefore, the illustrations and examples herein should be construed in an illustrative, and not a restrictive sense.

The invention claimed is:

1. A computer system, comprising:

a memory to store power consumption data values corresponding to a subset of brightness settings for a display; and a power prediction module to generate, using at least a portion of the power consumption data values stored in the memory, predicted power consumption data values corresponding to brightness settings for the display other than the subset of brightness settings for the display having corresponding power consumption data values stored in the memory.

2. The system of claim 1, wherein the memory corresponds to a system basic input/output system (BIOS).

3. The system of claim 1, wherein the memory is accessible by at least one of a system BIOS or system software.

4. The system of claim 1, further comprising:

an output module to provide predicted power consumption data values corresponding to brightness settings to a user.

5. The system of claim 1, further comprising:

a brightness adjustment module to control a brightness level of the display, the brightness adjustment module responsive to a brightness adjustment request.

6. The system of claim 1, wherein the power consumption data values to be stored in the memory include backlight power measurements of the display at two or more brightness settings.

7. The system of claim 1, wherein the power prediction module uses ratios of power-to-luminance for the subset of brightness settings to determine a gain value and an offset value, and generates the predicted power consumption data values based on the gain value and the offset value.

8. The system of claim 1, wherein the power consumption data values to be stored in the memory include power consumption data values corresponding to a maximum brightness setting for the display and an intermediate brightness setting for the display.

9. A computer-implemented method, comprising:

analyzing stored backlight power usage data associated with a subset of brightness levels for a display; and predicting backlight power usage for one or more brightness settings associated with other brightness levels for the display based at least in part on the analyzed stored backlight power usage data.

10. The method of claim 9, wherein analyzing stored backlight power usage data comprises:

determining a ratio of power to luminance for a first brightness level in the subset of brightness levels;

determining a ratio of power to luminance for a second brightness level in the subset of brightness levels;

subtracting the power-to-luminance ratio of the second brightness level from the power-to-luminance ratio of the first brightness level to determine a numerator;

subtracting the luminance of the second brightness level from the luminance of the first brightness level to determine a denominator; and dividing the numerator by the denominator to determine a gain value.

11. The method of claim 10, wherein analyzing stored backlight power usage data further comprises:

multiplying the gain value by the luminance of the second brightness level to determine a modified gain value; and subtracting the modified gain value from the power-to-luminance ratio of the second brightness level to determine an offset value.

12. The method of claim 11, wherein predicting backlight power usage for a brightness setting associated with a brightness level for the display comprises:

determining a square of a luminance value associated with the brightness level;

multiplying the square of the luminance value by the gain value to determine a multiplied value;

adding the offset value to the multiplied value to determine a predicted backlight power usage value for the brightness level; and outputting the predicted backlight power usage value.

13. The method of claim 9, wherein steps between brightness levels are non-linear.

14. The method of claim 9, wherein the analyzing and predicting are performed in response to a first user request, the method further comprising:

providing predicted backlight power usage data in response to the first request; and adjusting a current brightness level for the display in response to a second user request.

15. The method of claim 9, wherein the stored backlight power usage data includes backlight power usage data associated with a maximum brightness level for the display and backlight power usage data associated with an intermediate brightness level for the display.

16. A non-transitory computer-readable storage medium containing instructions that, when executed, cause a computer to:

estimate, based on stored power consumption data values associated with a subset of brightness levels for a display panel, future power consumption resulting from a change in brightness of the display panel to a level other than the subset of brightness levels; and report the estimated future power consumption as a contribution to a computer system power management decision.

17. The non-transitory computer-readable storage medium of claim 16, wherein the instructions that cause the computer to estimate future power consumption comprise further instructions that cause the computer to:

determine a ratio of power to luminance for a first brightness level of the display panel;

determine a ratio of power to luminance for a second brightness level of the display panel;

subtract the power-to-luminance ratio of the second brightness level from the power-to-luminance ratio of the first brightness level to determine a numerator;

subtract the luminance of the second brightness level from the luminance of the first brightness level to determine a denominator; and divide the numerator by the denominator to determine a gain value.

18. The non-transitory computer-readable storage medium of claim 17, wherein the instructions that cause the computer to estimate future power consumption comprise further instructions that cause the computer to:

determine an offset value based at least in part on one of the power to luminance ratios.

19. The non-transitory computer-readable storage medium of claim 18, wherein the instructions that cause the computer to estimate future power consumption comprise further instructions that cause the computer to:

determine a square of a luminance value associated with a brightness level of the display panel;

multiply the square of the luminance value by the gain value to determine a multiplied value;

add the offset value to the multiplied value to determine an estimated backlight power usage value for the brightness level of the display panel; and provide the estimated backlight power usage value to affect one or more display panel parameter settings.

20. The non-transitory computer-readable storage medium of claim 17, wherein the first brightness level comprises a maximum brightness level of the display panel and the second brightness level comprises an intermediate brightness level of the display panel.

* * * * *